United States Patent
Gu et al.

(10) Patent No.: US 11,906,619 B2
(45) Date of Patent: *Feb. 20, 2024

(54) SATURATION COMPENSATION USING A SMART-DEVICE-BASED RADAR SYSTEM

(71) Applicant: Google LLC, Mountain View, CA (US)

(72) Inventors: Changzhan Gu, Milpitas, CA (US); Jaime Lien, Mountain View, CA (US); Nicholas Edward Gillian, Palo Alto, CA (US); Jian Wang, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,753

(22) Filed: Feb. 28, 2023

(65) Prior Publication Data

US 2023/0204754 A1 Jun. 29, 2023

Related U.S. Application Data

(63) Continuation of application No. 16/772,566, filed as application No. PCT/US2019/020050 on Feb. 28, 2019, now Pat. No. 11,592,547.

(51) Int. Cl.
*G01S 7/41* (2006.01)
*G01S 7/48* (2006.01)
(Continued)

(52) U.S. Cl.
CPC ............ *G01S 13/584* (2013.01); *G01S 7/417* (2013.01); *G01S 7/4808* (2013.01); *G01S 13/08* (2013.01); *G01S 13/62* (2013.01); *G06F 3/017* (2013.01)

(58) Field of Classification Search
CPC .......... G01S 13/62; G01S 7/415; G01S 13/88; G01S 7/417; G06F 3/017; G06F 3/011; G06F 3/0346; G06F 3/04883
See application file for complete search history.

(56) References Cited

U.S. PATENT DOCUMENTS

2003/0068097 A1* 4/2003 Wilson ................ G06F 17/18
    382/276
2008/0065291 A1* 3/2008 Breed ................ G08B 21/22
    382/190

(Continued)

FOREIGN PATENT DOCUMENTS

| CN | 108361780 | 8/2018 |
| KR | 20180110825 | 10/2018 |
| WO | 2020176105 | 9/2020 |

OTHER PUBLICATIONS

"International Preliminary Report on Patentability", Application No. PCT/US2019/020050, dated Aug. 25, 2021, 12 pages.

(Continued)

*Primary Examiner* — Bernarr E Gregory
*Assistant Examiner* — Juliana Cross
(74) *Attorney, Agent, or Firm* — Colby Nipper PLLC

(57) ABSTRACT

Techniques and apparatuses are described that implement a smart-device-based radar system capable of detecting user gestures in the presence of saturation. In particular, a radar system employs machine learning to compensate for distortions resulting from saturation. This enables gesture recognition to be performed while the radar system's receiver is saturated. As such, the radar system can forgo integrating an automatic gain control circuit to prevent the receiver from becoming saturated. Furthermore, the radar system can operate with higher gains to increasing sensitivity without adding additional antennas. By using machine learning, the radar system's dynamic range increases, which enables the radar system to detect a variety of different types of gestures having small or large radar cross sections, and performed at various distances from the radar system.

20 Claims, 7 Drawing Sheets

(51) Int. Cl.
  *G01S 13/08*    (2006.01)
  *G01S 13/62*    (2006.01)
  *G01S 13/58*    (2006.01)
  *G06F 3/01*     (2006.01)

(56) References Cited

U.S. PATENT DOCUMENTS

| | | | |
|---|---|---|---|
| 2015/0277569 A1* | 10/2015 | Sprenger | G06F 3/017 |
| | | | 345/156 |
| 2020/0400811 A1 | 12/2020 | Gu et al. | |
| 2021/0368307 A1* | 11/2021 | Silverstein | G01S 13/58 |
| 2022/0297293 A1* | 9/2022 | Wilson | B25J 9/1674 |
| 2022/0300082 A1* | 9/2022 | Shin | G01S 7/417 |

OTHER PUBLICATIONS

"International Search Report and Written Opinion", Application No. PCT/US2019/020050, dated Nov. 22, 2019, 17 pages.
"Non-Final Office Action", U.S. Appl. No. 16/772,566, filed May 11, 2022, 34 pages.
"Notice of Allowance", U.S. Appl. No. 16/772,566, filed Nov. 4, 2022, 10 pages.

\* cited by examiner

SATURATION COMPENSATION USING A SMART-DEVICE-BASED RADAR SYSTEM

CROSS-REFERENCE TO RELATED APPLICATIONS

This application is a continuation of and claims priority to U.S. Non-Provisional patent application Ser. No. 16/772,566, filed on Jun. 12, 2020, which in turn is a National Stage Entry of International Application No. PCT/US2019/020050, filed Feb. 28, 2019, the disclosures of which are incorporated by reference herein in their entireties.

BACKGROUND

Radar-based gesture recognition can enable a user to interact with a small-screen smart device, such as a smartphone or a smart watch, without using virtual keyboards or screen-based gestures. In many cases, a radar sensor may replace a bulky and expensive sensor, such as a camera, and provide improved gesture-recognition performance in the presence of different environmental conditions, such as low lighting and fog, or with moving or overlapping targets. While it may be advantageous to use the radar sensor, there are many challenges associated with integrating the radar sensor in commercial devices and using the radar sensor for gesture recognition.

One such problem involves restrictions that a small consumer device may place on a radar sensor's design. To satisfy size or layout constraints, for example, hardware circuitry within the radar sensor may be downsized by reducing a quantity of antenna elements or foregoing certain hardware components, such as an automatic gain control circuit. Consequently, a dynamic range of the radar sensor can be reduced, which limits the radar sensor's ability to perform gesture recognition. With fewer antenna elements, for example, the radar may be unable to recognize gestures at farther distances. Also, without an automatic gain control circuit, close range gestures can saturate the radar sensor's receiver and result in signal clipping. While the receiver is saturated, a noise floor of the receiver can increase, thereby decreasing measurement accuracies, increasing a false alarm rate, and decreasing sensitivity performance of the radar sensor.

SUMMARY

Techniques and apparatuses are described that implement a smart-device-based radar system capable of detecting user gestures in the presence of saturation. In particular, a radar system includes a saturation compensation module that employs machine learning to improve the radar system's dynamic range. More specifically, the saturation compensation module accepts a saturated version of a radar receive signal and generates a non-saturated version of the radar receive signal. With this non-saturated version, the radar system can accurately determine range, Doppler frequency, angle, and radar cross section of an object for gesture recognition. As such, the radar system can detect gestures performed by a user at close ranges that saturate the radar system's receiver.

By using machine learning to compensate for distortions caused by the saturated receiver, the radar system can avoid additional hardware complexity and cost associated with integrating an automatic gain control circuit to prevent the receiver from becoming saturated. Furthermore, the machine learning can be trained to recover motion component signals that are associated with a variety of different gestures and are affected by different amounts of signal clipping. To further improve the dynamic range, the radar system can operate with higher gains to increase sensitivity, despite the increased likelihood of the receiver becoming saturated. In this way, the radar system's sensitivity increases without increasing a quantity of antennas. With improved dynamic range, the radar system can detect a variety of different types of gestures having small or large radar cross sections, and being performed at various distances from the radar system.

Aspects described below include an apparatus with a radar system. The radar system includes at least one antenna, a transceiver, a saturation compensation module, and a gesture recognition module. The transceiver is coupled to the at least one antenna and is configured to transmit, via the at least one antenna, a radar transmit signal. The transceiver is also configured to receive, via the at least one antenna, a radar receive signal, which includes a portion of the radar transmit signal that is reflected by a user. The transceiver is further configured to generate, based on the radar receive signal, a saturated radar receive signal with a clipped amplitude. The saturation compensation module is coupled to the transceiver and is configured to generate, based on the saturated radar receive signal and using machine learning, a predicted signal, which comprises a sinusoidal signal. The gesture recognition module is coupled to the saturation compensation module and is configured to determine a gesture performed by the user based on the predicted signal.

Aspects described below also include a method for performing operations of a smart-device-based radar system capable of detecting user gestures in the presence of saturation. The method includes transmitting a radar transmit signal and receiving a radar receive signal. The radar receive signal includes a portion of the radar transmit signal that is reflected by a user. The method also includes generating, based on the radar receive signal, a saturated radar receive signal with a clipped amplitude. The method further includes generating, based on the saturated radar receive signal and using a machine-learned module, a predicted signal, which comprises a sinusoidal signal. The method also includes determining a gesture performed by the user based on the predicted signal.

Aspects described below also include a computer-readable storage media comprising computer-executable instructions that, responsive to execution by a processor, implement a saturation compensation module and a gesture recognition module. The saturation compensation module is configured to accept an input data sequence associated with a saturated radar receive signal. The saturated radar receive signal has a clipped amplitude that distorts a motion component signal associated with a gesture performed by a user. The saturated radar receive signal includes a distorted version of the motion component signal. The saturation compensation module is also configured to recover, using machine learning, the motion component signal from the input data sequence to produce a predicted data sequence based on the motion component signal. The predicted data sequence comprises a sinusoidal signal. The gesture recognition module is configured to determine the gesture based on the predicted data sequence.

Aspects described below also include a system with machine-learning means for recovering a motion component signal from a saturated radar receive signal that includes a distorted version of the motion component signal.

BRIEF DESCRIPTION OF THE DRAWINGS

Apparatuses for and techniques implementing a smart-device-based radar system capable of detecting user gestures in the presence of saturation are described with reference to the following drawings. The same numbers are used throughout the drawings to reference like features and components.

DETAILED DESCRIPTION

Overview

Figure 1:
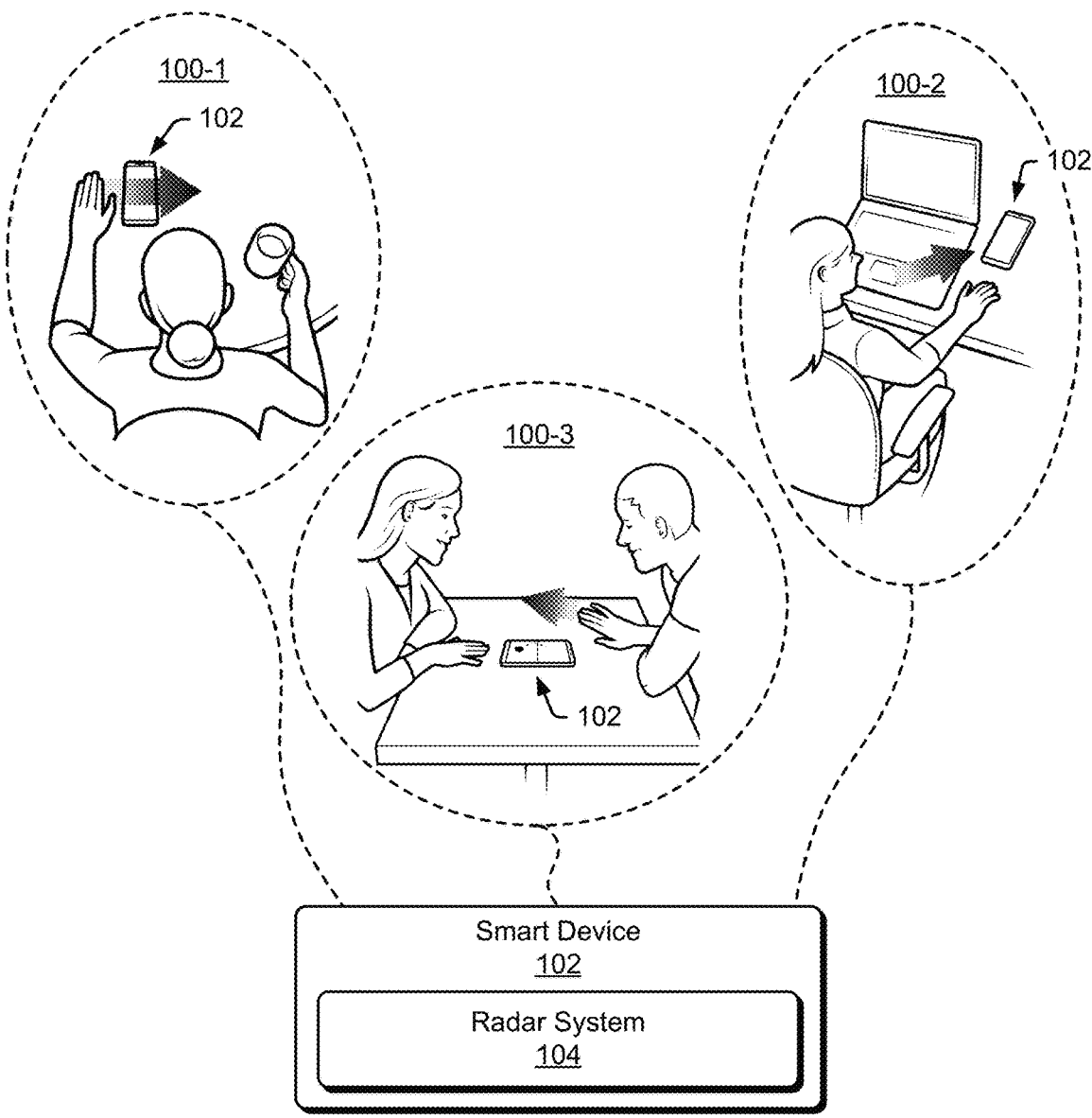
FIG. 1 illustrates example environments in which a smart-device-based radar system capable of detecting user gestures in the presence of saturation can be implemented.
Figure 1:
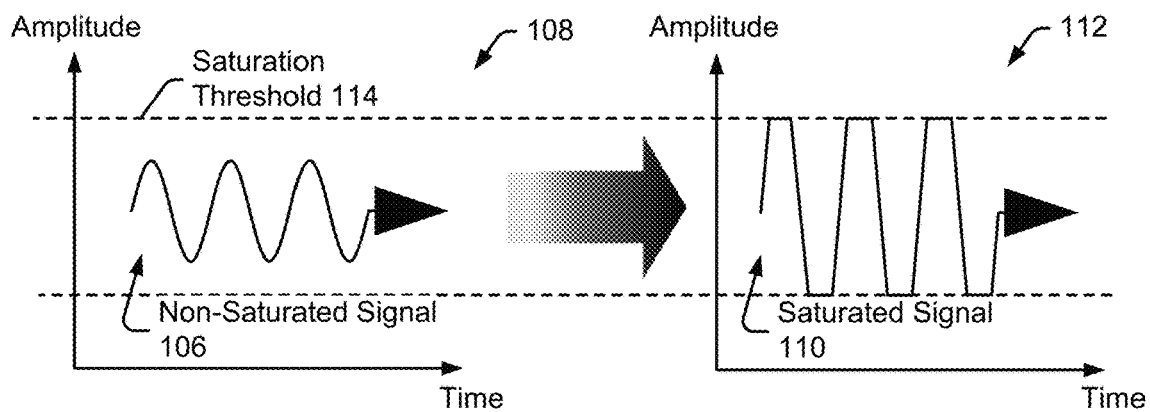

While it may be advantageous to use a radar sensor to detect user gestures, there are many challenges associated with integrating the radar sensor in commercial devices and using the radar sensor for gesture recognition. One such problem involves restrictions that a small consumer device may place on a radar sensor's design. To satisfy size or layout constraints, for example, hardware circuitry within the radar sensor may be downsized by reducing a quantity of antenna elements or foregoing certain hardware components, such as an automatic gain control circuit. Consequently, a dynamic range of the radar sensor can be reduced, which limits the radar sensor's ability to perform gesture recognition. With fewer antenna elements, for example, the radar may be unable to recognize gestures at farther distances. Also, without an automatic gain control circuit, close range gestures can saturate the radar sensor's receiver and result in signal clipping. While the receiver is saturated, a noise floor of the receiver can increase, thereby decreasing measurement accuracies, increasing a false alarm rate, and decreasing sensitivity performance of the radar sensor.

To address this problem, some techniques avoid saturating the radar system by limiting gesture recognition performance to distances that are sufficiently far from the radar system. This may make it cumbersome and awkward for the user to perform the gestures and interact with the consumer device, however. Other techniques avoid saturating the radar system by implementing an automatic gain control circuit, which automatically reduces transmission power to prevent the radar system from becoming saturated. Integrating the automatic gain control circuit within the radar system, however, can increase hardware complexity and cost of the radar system Furthermore, the automatic gain control circuit can increase a footprint of the radar system, thereby making it impractical for the radar system to be integrated within mobile devices that place a premium on small size and low weight.

In contrast, techniques described herein present a smart-device-based radar system capable of detecting user gestures in the presence of saturation. In particular, a radar system includes a saturation compensation module that employs machine learning to improve the radar system's dynamic range. More specifically, the saturation compensation module accepts a saturated version of a radar receive signal and generates a non-saturated version of the radar receive signal. With this non-saturated version, the radar system can accurately determine range, Doppler frequency, angle, and radar cross section of an object for gesture recognition. As such, the radar system can detect gestures performed by a user at close ranges that saturate the radar system's receiver.

By using machine learning to compensate for distortions caused by the saturated receiver, the radar system can avoid additional hardware complexity and cost associated with integrating an automatic gain control circuit to prevent the receiver from becoming saturated. Furthermore, the machine learning can be trained to recover motion component signals that are associated with a variety of different gestures and are affected by different amounts of signal clipping. To further improve the dynamic range, the radar system can operate with higher gains to increase sensitivity, despite the increased likelihood of the receiver becoming saturated. In this way, the radar system's sensitivity increases without increasing a quantity of antennas. With improved dynamic range, the radar system can detect a variety of different types of gestures having small or large radar cross sections, and being performed at various distances from the radar system.

Example Environment

FIG. 1 is an illustration of example environments in which techniques using, and an apparatus including, a smart-device-based radar system capable of detecting user gestures in the presence of saturation may be embodied. In the depicted environments 100-1, 100-2, and 100-3, a smart device 102 includes a radar system 104 capable of performing gesture recognition. Although the smart device 102 is shown to be a smartphone in FIG. 1, the smart device 102 can be implemented as any suitable computing or electronic device, as described in further detail with respect to FIG. 2.

In the environments 100-1 to 100-3, a user performs different types of gestures, which are detected by the radar system 104. For example, the user in environment 100-1 makes a scrolling gesture by moving a hand above the smart device 102 along a horizontal dimension (e.g., from a left side of the smart device 102 to a right side of the smart device 102). In the environment 100-2, the user makes a reaching gesture, which decreases a distance between the smart device 102 and the user's hand. The users in environment 100-3 make hand gestures to play a game on the smart device 102. In one instance, a user makes a pushing gesture by moving a hand above the smart device 102 along a vertical dimension (e.g., from a bottom side of the smart device 102 to a top side of the smart device 102).

The radar system 104 can also recognize other types of gestures or motions not shown in FIG. 1. Example types of gestures include, a knob-turning gesture in which a user curls their fingers to grip an imaginary door knob and rotate their fingers and hand in a clockwise or counter-clockwise fashion to mimic an action of turning the imaginary door knob. Another example type of gesture includes a spindle-twisting gesture, which a user performs by rubbing a thumb and at least one other finger together. The gestures can be two-dimensional, such as those usable with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 102 may perform an action, such as display new content, move a cursor, activate one or more sensors, open an application, and so forth. In this way, the radar system 104 provides touch-free control of the smart device 102.

In some situations, at least a portion of a gesture performed by the user is at a sufficiently far distance from the radar system 104 or has a sufficiently small radar cross section such that radar system 104 is not saturated. In this case, the radar system 104 generates a non-saturated signal 106, as shown in a graph 108 at the bottom right of FIG. 1. As the radar system 104 is not saturated by the gesture, signal clipping does not occur and the non-saturated signal 106 is a sinusoidal signal having a non-clipped amplitude. Characteristics of the non-saturated signal 106 can therefore be directly analyzed by the radar systems 104 for gesture recognition.

In other situations, however, at least a portion of a gesture is at a sufficiently close distance to the radar system 104 or has a sufficiently large radar cross section such that the radar system 104 is saturated. Without an automatic gain control circuit to automatically adjust transmission power to avoid the saturation, signal clipping occurs and the radar system 104 generates a saturated signal 110, as shown in a graph 112 at the bottom left of FIG. 1. Due to the signal clipping, the saturated signal 110 is a non-sinusoidal signal. More specifically, the signal clipping causes an amplitude of the saturated signal 110 to be constrained within a saturation threshold 114 of the radar system 104. In other words, at least a portion of the amplitude of the saturated signal 110 is relatively constant and does not linearly increase based on an amplitude of a reflected radar signal. This clipping makes it challenging for the radar system 104 to recognize the gestures performed by the user directly from the saturated signal 110. Using machine learning, however, the radar system 104 can be trained to recover a sinusoidal signal from the saturated signal 110 to improve gesture recognition as well as other radar functions, such as presence detection, human vital-sign detection, collision avoidance, and so forth.

Some implementations of the radar system 104 are particularly advantageous as applied in the context of smart devices 102, for which there is a convergence of issues such as a need for limitations in a spacing and layout of the radar system 104, low power, and other issues. Although the implementations are particularly advantageous in the described context of a system for which gesture recognition is required, it is to be appreciated that the applicability of the features and advantages of the present invention is not necessarily so limited, and other implementations involving other types of electronic devices may also be within the scope of the present teachings.

Exemplary overall lateral dimensions of the smart device 102 can be, for example, approximately eight centimeters by approximately fifteen centimeters. Exemplary footprints of the radar system 104 can be even more limited, such as approximately four millimeters by six millimeters with antennas included. Exemplary power consumption of the radar system 104 may be on the order of a few milliwatts to several milliwatts (e.g., between approximately two milliwatts and twenty milliwatts). The requirement of such a limited footprint and power consumption for the radar system 104, enables the smart device 102 to include other desirable features in such a space-limited package (e.g., a camera sensor, a fingerprint sensor, a display, and so forth). The smart device 102 and the radar system 104 are further described with respect to FIG. 2.

Figure 2:
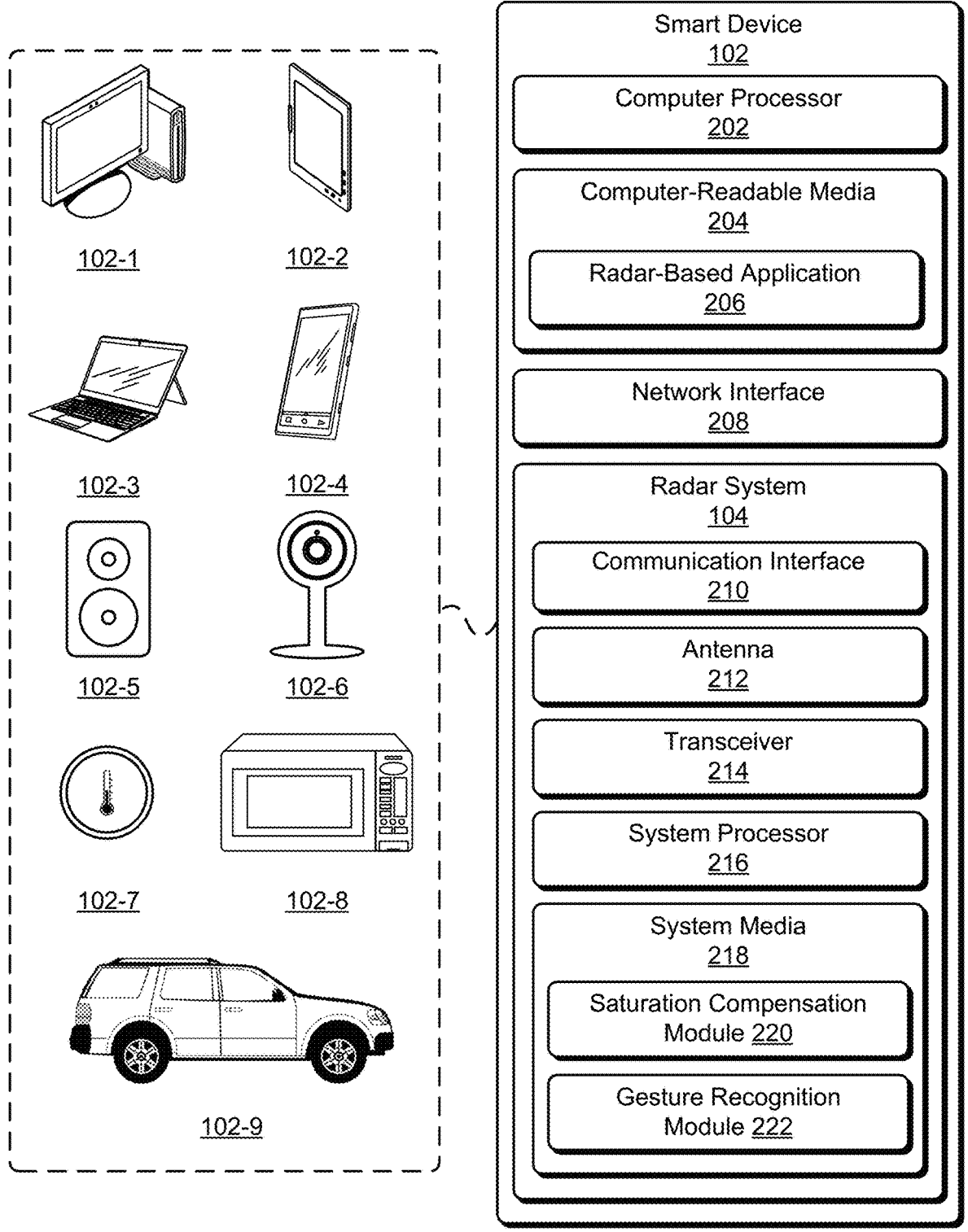
FIG. 2 illustrates an example implementation of a radar system as part of a smart device.

FIG. 2 illustrates the radar system 104 as part of the smart device 102. The smart device 102 can be any suitable computing device or electronic device, such as a desktop computer 102-1, a tablet 102-2, a laptop 102-3, a smartphone 102-4, a smart speaker 102-5, a security camera 102-6, a smart thermostat 102-7, a microwave 102-8, and a vehicle 102-9. Other devices may also be used, such as home-service devices, baby monitors, Wi-Fi™ routers, computing watches, computing glasses, gaming systems, televisions, drones, track pads, drawing pads, netbooks, e-readers, home-automation and control systems, and other home appliances. The smart device 102 can be wearable, non-wearable but mobile, or relatively immobile (e.g., desktops and appliances). The radar system 104 can be used as a stand-alone radar system or used with, or embedded within, many different computing devices or peripherals, such as in control panels that control home appliances and systems, in automobiles to control internal functions (e.g., volume, cruise control, or even driving of the car), or as an attachment to a laptop computer to control computing applications on the laptop.

The smart device 102 includes one or more computer processors 202 and computer-readable media 204, which includes memory media and storage media. Applications and/or an operating system (not shown) embodied as computer-readable instructions on the computer-readable media 204 can be executed by the computer processor 202 to provide some of the functionalities described herein. The computer-readable media 204 also includes a radar-based application 206, which uses radar data generated by the radar system 104 to perform a function, such as gesture-based control, presence detection, human vital-sign notification, or collision avoidance for autonomous driving.

The smart device 102 also includes a network interface 208 for communicating data over wired, wireless, or optical networks. For example, the network interface 208 communicates data over a local-area-network (LAN), a wireless local-area-network (WLAN), a personal-area-network (PAN), a wire-area-network (WAN), an intranet, the Internet, a peer-to-peer network, a point-to-point network, a mesh network, and the like. The smart device 102 may also include a display or speakers (not shown).

The radar system 104 includes a communication interface 210 to transmit the radar data to a remote device, though this need not be used if the radar system 104 is integrated within the smart device 102. In general, the radar data provided by the communication interface 210 is in a format usable by the radar-based application 206.

The radar system 104 also includes at least one antenna 212 and at least one transceiver 214 to transmit and receive radar signals. The antenna 212 can be circularly polarized, horizontally polarized, or vertically polarized. In some cases, the radar system 104 includes multiple antennas 212 implemented as antenna elements of an antenna array. The antenna array can include at least one transmitting antenna element and at least two receiving antenna elements. In some situations, the antenna array includes multiple transmitting antenna elements to implement a multiple-input multiple-output (MIMO) radar capable of transmitting multiple distinct waveforms at a given time (e.g., a different waveform per transmitting antenna element). The receiving antenna elements can be positioned in a one-dimensional shape (e.g., a line) or a two-dimensional shape (e.g., a triangle, a rectangle, or an L-shape) for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation).

Using the antenna array, the radar system 104 can form beams that are steered or un-steered, wide or narrow, or shaped (e.g., as a hemisphere, cube, fan, cone, or cylinder). The one or more transmitting antenna elements may have an un-steered omnidirectional radiation pattern or may be able to produce a wide steerable beam. Either of these techniques enable the radar system 104 to illuminate a large volume of space. To achieve target angular accuracies and angular resolutions, the receiving antenna elements can be used to generate thousands of narrow steered beams (e.g., 2000 beams, 4000 beams, or 6000 beams) with digital beamforming. In this way, the radar system 104 can efficiently monitor an external environment and detect gestures from one or more users.

The transceiver 214 includes circuitry and logic for transmitting and receiving radar signals via the antenna 212. Components of the transceiver 214 can include amplifiers, mixers, switches, analog-to-digital converters, filters, and so forth for conditioning the radar signals. The transceiver 214 also includes logic to perform in-phase/quadrature (I/Q) operations, such as modulation or demodulation. A variety of modulations can be used to produce the radar signals, including linear frequency modulations, triangular frequency modulations, stepped frequency modulations, or phase modulations. The transceiver 214 can be configured to support continuous-wave or pulsed radar operations.

A frequency spectrum (e.g., range of frequencies) that the transceiver 214 can use to generate radar signals can encompass frequencies between 1 and 400 gigahertz (GHz), between 1 and 24 GHz, between 2 and 6 GHz, between 4 and 100 GHz, or between 57 and 63 GHz. In some cases, the frequency spectrum can be divided into multiple sub-spectrums that have similar or different bandwidths. Example bandwidths can be on the order of 500 megahertz (MHz), one gigahertz (GHz), two gigahertz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 104 may also include one or more system processors 216 and a system media 218 (e.g., one or more computer-readable storage media). Although the system processor 216 is shown to be separate from the transceiver 214 in FIG. 2, the system processor 216 may be implemented within the transceiver 214 as a digital signal processor or a low-power processor, for instance. The system processor 216 executes computer-readable instructions that are stored within the system media 218. Example digital operations performed by the system processor 216 include Fast-Fourier Transforms (FFTs), filtering, modulations or demodulations, digital signal generation, digital beamforming, and so forth.

The system media 218 includes a saturation compensation module 220 and a gesture recognition module 222 (e.g., a human gesture recognition module 222). The saturation compensation module 220 employs machine learning to recover a sinusoidal signal from a saturated non-sinusoidal signal. In other words, the saturation compensation module 220 analyzes a saturated version of a reflected radar signal and generates a non-saturated version of the reflected radar signal that does not include the distortions resulting from the saturation. Using the saturation compensation module 220, the radar system 104 can perform gesture recognition while saturated and realize increased dynamic range. If the radar system 104 is not saturated, the saturation compensation module 220 can also process non-saturated signals 106 without degrading performance of the radar system 104.

Figure 4:
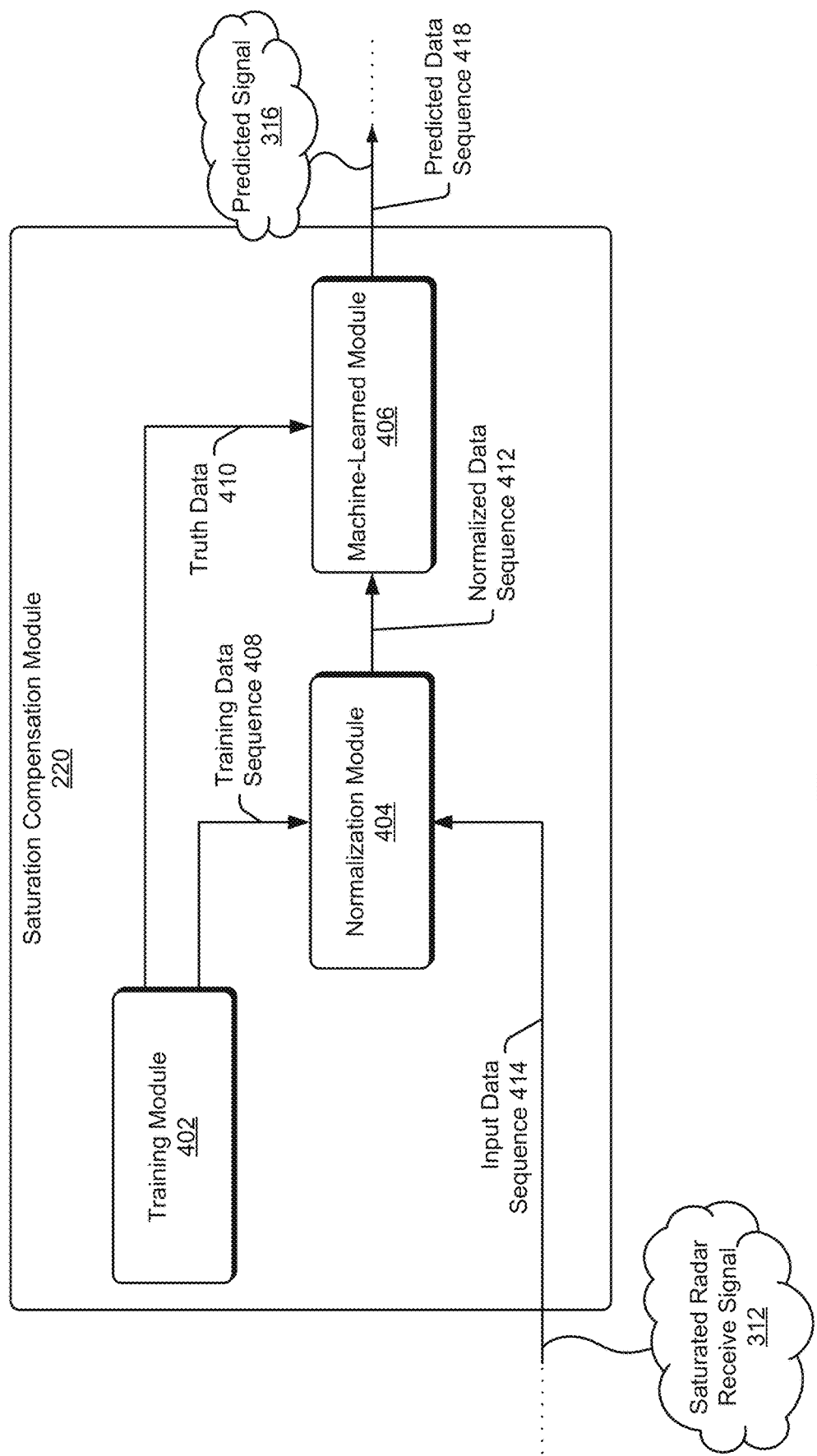
FIG. 4 illustrates an example scheme performed by a saturation compensation module for detecting user gestures in the presence of saturation.

The saturation compensation module 220 relies on supervised learning and can use simulated (e.g., synthetic) data or measured (e.g., real) data for machine-learning training purposes, as further described with respect to FIG. 4. Training enables the saturation compensation module 220 to learn a non-linear mapping function for translating a saturated version of a radar receive signal into a predicted signal that represents a non-saturated version of the radar receive signal.

The saturation compensation module 220 can include one or more artificial neural networks (referred to herein as neural networks). A neural network includes a group of connected nodes (e.g., neurons or perceptrons), which are organized into one or more layers. As an example, the saturation compensation module 220 includes a deep neural network, which includes an input layer, an output layer, and one or more hidden layers positioned between the input layer and the output layers. The nodes of the deep neural network can be partially-connected or fully connected between the layers.

In some cases, the deep neural network is a recurrent deep neural network (e.g., a long short-term memory (LSTM) recurrent deep neural network) with connections between nodes forming a cycle to retain information from a previous portion of an input data sequence for a subsequent portion of the input data sequence. In other cases, the deep neural network is a feed-forward deep neural network in which the connections between the nodes do not form a cycle. Additionally or alternatively, the saturation compensation module 220 can include another type of neural network, such as a convolutional neural network. An example deep neural network is further described with respect to FIG. 6. The saturation compensation module 220 can also include one or more types of regression models, such as a single linear regression model, multiple linear regression models, logistic regression models, step-wise regression models, multi-variate adaptive regression splines, locally estimated scatterplot smoothing models, and so forth.

Generally, a machine learning architecture of the saturation compensation module 220 can be tailored based on available power, available memory, or computational capability. The machine learning architecture can also be tailored based on a quantity of gestures the radar system 104 is designed to recognize. In some cases, the saturation compensation module 220 can be trained to automatically recover information associated with a variety of different types of gestures. In this way, the radar system 104 can seamlessly provide gesture recognition as a user performs different gestures that may or may not saturate the radar system 104.

Alternatively, to reduce a complexity of the saturation compensation module 220, the saturation compensation module 220 can be re-trained for different sets of gestures performed by the user. In this case, the radar-based application 206 can prompt the user to select a set of gestures or automatically determine the set of gestures based on a running application or gesture-based controls that are currently available to the user. The radar-based application 206 informs the saturation compensation 220 of the selected set of gestures, which enables the saturation compensation module 220 to initiate a training procedure for the set of gestures.

The gesture recognition module 222 receives the predicted signal from the saturation compensation module 220 and analyzes the predicted signal to determine the gesture performed by the user. In some cases, the gesture recognition module 222 uses the communication interface 210 to inform the radar-based application 206 of the determined gesture.

Although shown to be included within the system media 218, other implementations of the saturation compensation module 220 and/or the gesture recognition module 222 can be included, at least partially, within the computer-readable media 204. In this case, at least some functionality of the saturation compensation module 220 or the gesture recognition module 222 can be by the computer processor 202. Although not shown, the system media 218 can also include other types of modules, such as a user detection module, a human vital-sign detection module, a collision avoidance module, a digital beamforming module, and so forth. The radar system 104 is further described with respect to FIG. 3.

Detecting User Gestures in the Presence of Saturation

Figure 3:
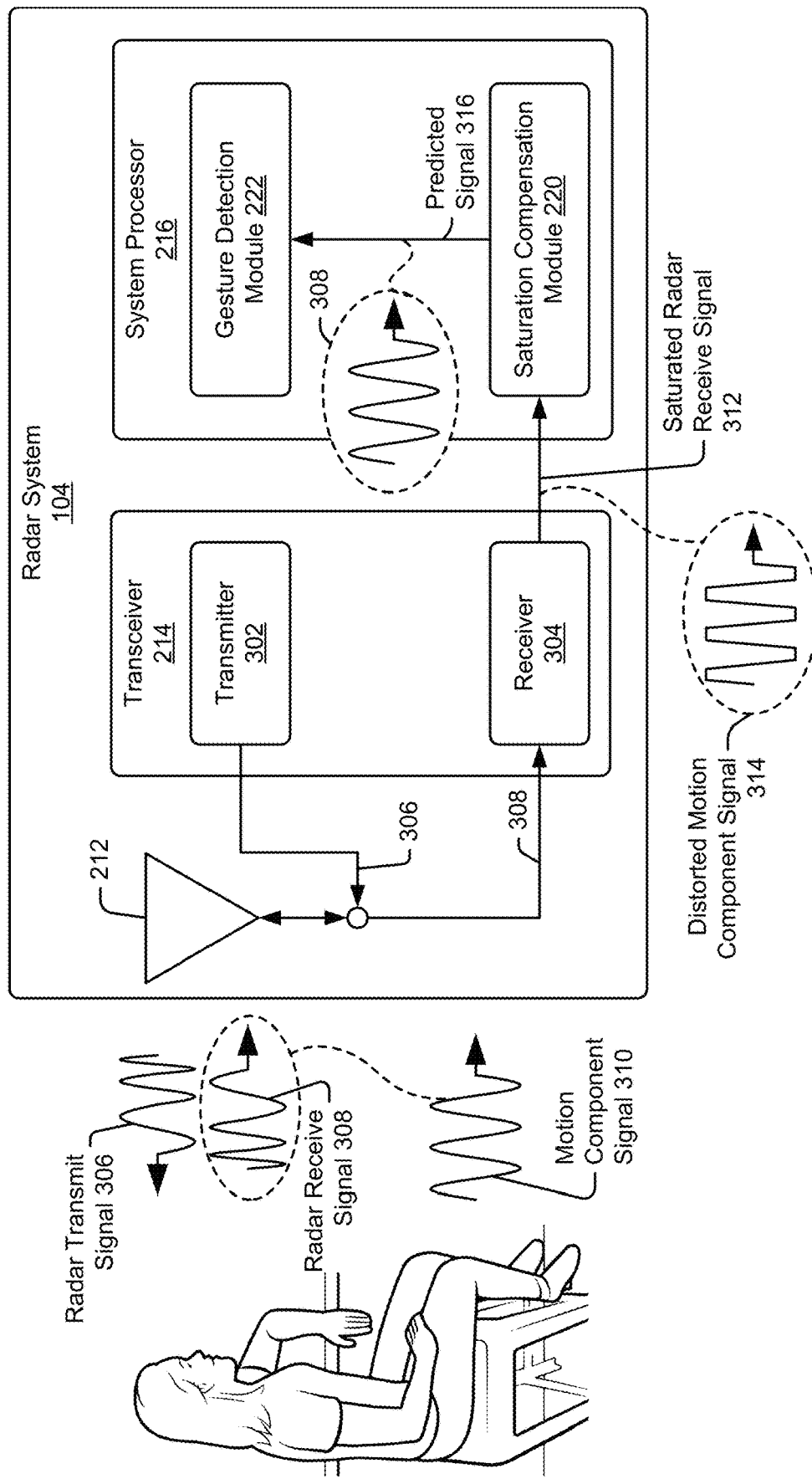
FIG. 3 illustrates an example operation of a radar system for detecting user gestures in the presence of saturation.

FIG. 3 illustrates an example operation of the radar system 104 for detecting user gestures in the presence of saturation. In the depicted configuration, the radar system 104 is shown to include the antenna 212, the transceiver 214, and the system processor 216. The antenna 212 is indirectly or directly coupled to the transceiver 214, which includes a transmitter 302 and a receiver 304. The system processor 216 is coupled to the transceiver 214 and executes the saturation compensation module 220 and the gesture recognition module 222.

The receiver 304 includes components, such as a preamplifier, a low-noise amplifier, a variable gain amplifier, or a baseband amplifier, which have a limited dynamic range. If these components are subject to signals with amplitudes that exceed a corresponding saturation threshold, the components can clip the signals and produce distorted signals. Due to signal clipping, a signal-to-noise ratio of the signal decreases as the signal's power is constrained and this constraint increases the power associated with noise. The increase in the noise power further raises a noise floor of the receiver 304, which can make it challenging to detect weaker signals associated with other users or other gestures.

During operation, the transmitter 302 generates and provides a radar transmit signal 306 to the antenna 212. As an example, the radar transmit signal 306 is a continuous-wave frequency-modulated signal, as illustrated in FIG. 3. The antenna 212 transmits the radar transmit signal 306, which impinges on a user. Consequently, a radar receive signal 308 is reflected from the user and includes at least a portion of the radar transmit signal 306. Due to the Doppler effect, however, a frequency of the radar receive signal 308 differs from the radar transmit signal 306 based on a motion of the user. More specifically, the radar receive signal 308 includes a motion component signal 310, which includes amplitude and frequency information associated with the motion of the user.

The receiver 304 receives the radar receive signal 308 via the antenna 212 and processes the radar receive signal 308 (e.g., amplifies, downconverts, filters, demodulates, or digitizes the radar receive signal 308). In particular, the receiver 304 mixes a version of the radar receive signal 308 with a version of the radar transmit signal 306 to generate a beat signal. A frequency of the beat signal represents a frequency offset between the radar transmit signal 306 and the radar receive signal 308. This frequency varies based on the motion of the user. In this manner, the beat signal includes the motion component signal 310.

In situations in which an amplitude of the radar receive signal 308 causes the receiver 304 to become saturated, however, the receiver 304 generates a saturated beat signal, which is referred to herein as a saturated radar receive signal 312. A clipped amplitude of the saturated radar receive signal 312 distorts the motion component signal 310, and results in the saturated radar receive signal 312 including a distorted motion component signal 314 (e.g., a distorted version of the motion component signal 310). The saturated radar receive signal 312 includes a temporal sequence of samples, which are provided as an input data sequence to the saturation compensation module 220, as shown in FIG. 4.

The saturation compensation module 220 generates a predicted signal 316 based on the saturated radar receive signal 312. In particular, the saturation compensation module 220 processes different sets of samples based on a temporal processing window, recovers the motion component signal 310 from within these sets of samples, and outputs sets of predicted samples that are associated with the motion component signal 310. In effect, the saturation compensation module 220 compensates for distortions within the saturated radar receive signal 312 to produce the predicted signal 316 based on the motion component signal 310. As such, the predicted signal 316 has a larger signal-to-noise ratio relative to the saturated radar receive signal 312. By processing the predicted signal 316 for gesture recognition, the radar system 104 can realize improved measurement accuracies, a decreased false alarm rate, and improved sensitivity. Although not explicitly shown, the receiver 304 or the system processor 216 can also include a band-pass filter that filters the radar receive signal 308 for frequencies outside a general frequency range of the motion component signal 310 prior to providing the saturated radar receive signal 312 to the saturation compensation module 220.

The gesture recognition module 222 determines a gesture performed by the user based on the predicted signal 316. More specifically, the gesture recognition module 222 analyzes the predicted signal 316 to measure a position (e.g., range, azimuth, and/or elevation) or range rate of one or more scattering points associated with the user. With these measurements, the gesture recognition module 222 can determine other types of information to further assist with gesture recognition, including velocity (e.g., speed), acceleration, or radar cross section. The gesture recognition module 222 can also use FFTs, digital beamforming, or prediction and tracking algorithms to determine this information. The scatting points can be associated with different regions on the user's appendage or different appendages, such as different fingers or hands, different portions of the user's hand, different portions of the user's arm, and so forth. Depending on the type of gesture performed, these scattering points may move differently with respect to each other. By analyzing the information associated with the scattering points over time, the gesture recognition module 222 determines the gesture. Operations performed by the saturation compensation module 220 are further described with respect to FIG. 4.

FIG. 4 illustrates an example scheme performed by the saturation compensation module 220 for detecting user gestures in the presence of saturation. In the depicted configuration, the saturation compensation module 220 includes a training module 402, a normalization module 404, and a machine-learned module 406. In general, the machine-learned module 406 can be implemented using one or more of the machine learning architectures described above with respect to FIG. 2. An example implementation of the machine-learned module 406 is further described with respect to FIG. 5.

The training module 402 is coupled to the normalization module 404 and the machine-learned module 406. The normalization module 404 is also coupled to an input of the saturation compensation module 220, which can be coupled to the receiver 304 (of FIG. 3). The machine-learned model 406 is coupled to the normalization module 404 and an output of the saturation compensation module 220, which can be coupled to the gesture recognition module 222 (of FIG. 3).

The training module 402 provides a training data sequence 408 and truth data 410 for training the machine-learned module 406 to recover the motion component signal 310 from the saturated radar receive signal 312. The training data sequence 408 and the truth data 410 can be based on simulated data or measured data, either of which can be stored within the system media 218 or generated in real time during an initialization procedure. Although the training module 402 is shown to be included within the saturation compensation module 220 in FIG. 4, the training module 402 can alternatively be implemented separate from the saturation compensation module 220.

In the simulated data case, the training module 402 generates sinusoidal signals to simulate non-saturated radar receive signals that represent probable motion component signals. The sinusoidal signals can be periodic signals and vary in frequency from each other. In some cases, the sinusoidal signals represent different types of gestures performed by the user, such as those described above with respect to FIG. 1. The truth data 410 includes the sinusoidal signals, which the training module 402 provides to the machine-learned module 406 during a training procedure.

Additionally, the training module 402 generates non-sinusoidal signals having different clipped amplitudes to simulate probable saturated radar receive signals. The non-sinusoidal signals are associated with different amplitudes of a radar receive signal. As such, an amount of clipping observed within the non-sinusoidal signals varies across the non-sinusoidal signals. Furthermore, frequencies of the non-sinusoidal signals correspond to the frequencies of the sinusoidal signals. In general, the sinusoidal signals and the non-sinusoidal signals are generated to have a similar quantity of samples. The non-sinusoidal signals can also be periodic. These non-sinusoidal signals form the training data sequence 408, which the training module 402 provides to the normalization module 404, as shown in FIG. 4, or to the machine-learned module 406 if the training data sequence 408 is normalized.

In the measured data case, the training module 402 can be coupled to a proximity sensor within the smart device 102, which measures distances to the user. The proximity sensor can be a camera, an infra-red sensor, and so forth. The training module 402 receives the measurement data from the proximity sensor and generates the truth data 410 based on the measurement data. In particular, the training module 402 generates sinusoidal signals that have different frequencies that represent the different measured distances to the user. Additionally, the training module 402 is coupled to the transceiver 214 of FIG. 3, and causes the radar system 104 to operate (e.g., transmit one or more radar transmit signals 306 and receive one or more radar receive signals 308) during a time period that the proximity sensor measures the distances to the user. In this way, a gesture performed by the user during this time period is captured by the radar receive signals 308. The training module 402 can perform an extrapolation operation to generate the training data sequence 408 based on the radar receive signal 308. The training module 402 provides the truth data 410 to the machine-learned module 406 and the training data sequence 408 to the normalization module 404 during the training procedure. The training procedure is further described below.

The normalization module 404 performs a normalization operation that generates a normalized data sequence 412 based on an input signal (e.g., an input data sequence 414 or the training data sequence 408). As one example, the normalization module 404 normalizes the input signal by subtracting a mean value of the input signal across a given dimension's feature values from each individual feature value and then dividing by the standard deviation or another metric. By normalizing the input signal, the saturation compensation module 220 is able to account for amplitude variations resulting from changes in a user's distance from the radar system 104 during gesture recognition. This normalization operation also enables the machine-learned module 406 to efficiently determine machine-learning parameters (e.g., weights and bias parameters) that optimize a cost function (e.g., an objective function).

During a training procedure, the training module 402 provides a training data sequence 408 to the normalization module 404 and associated truth data 410 to the machine-learned module 406. The normalization module 404 normalizes the training data sequence 408 and provides a normalized data sequence 412 to the machine-learned module 406. The machine-learned module 406 processes the normalized data sequence 412 and generates a predicted data sequence 418. The machine-learned module 406 also determines the machine-learning parameters that minimize an error between the resulting predicted data sequence 418 and the truth data 410 using a cost function, such as a mean square error. As an example, the machine-learned module 406 uses a gradient descent method to optimize the cost function. Generally speaking, this training procedure enables the machine-learned module 406 to effectively recover the motion component signal 310 from the saturated radar receive signal 312 and generate the predicted data sequence 418 based on the motion component signal 310.

During gesture recognition, the normalization module 404 accepts the input data sequence 414 from an input of the saturation compensation module 220. As described with respect to FIG. 3, this input data sequence 414 can represent the saturated radar receive signal 312, which is provided by the receiver 304. The normalization module 404 normalizes the saturated radar receive signal 312 and provides the normalized data sequence 412 to the machine-learned module 406. Using the machine-learning parameters determined during the training procedure, the machine-learned module 406 recovers the motion component signal 310 from the normalized data sequence 412 and generates the predicted data sequence 418 based on the motion component signal 310. The machine-learned module 406 is further described with respect to FIG. 5.

Figure 5:
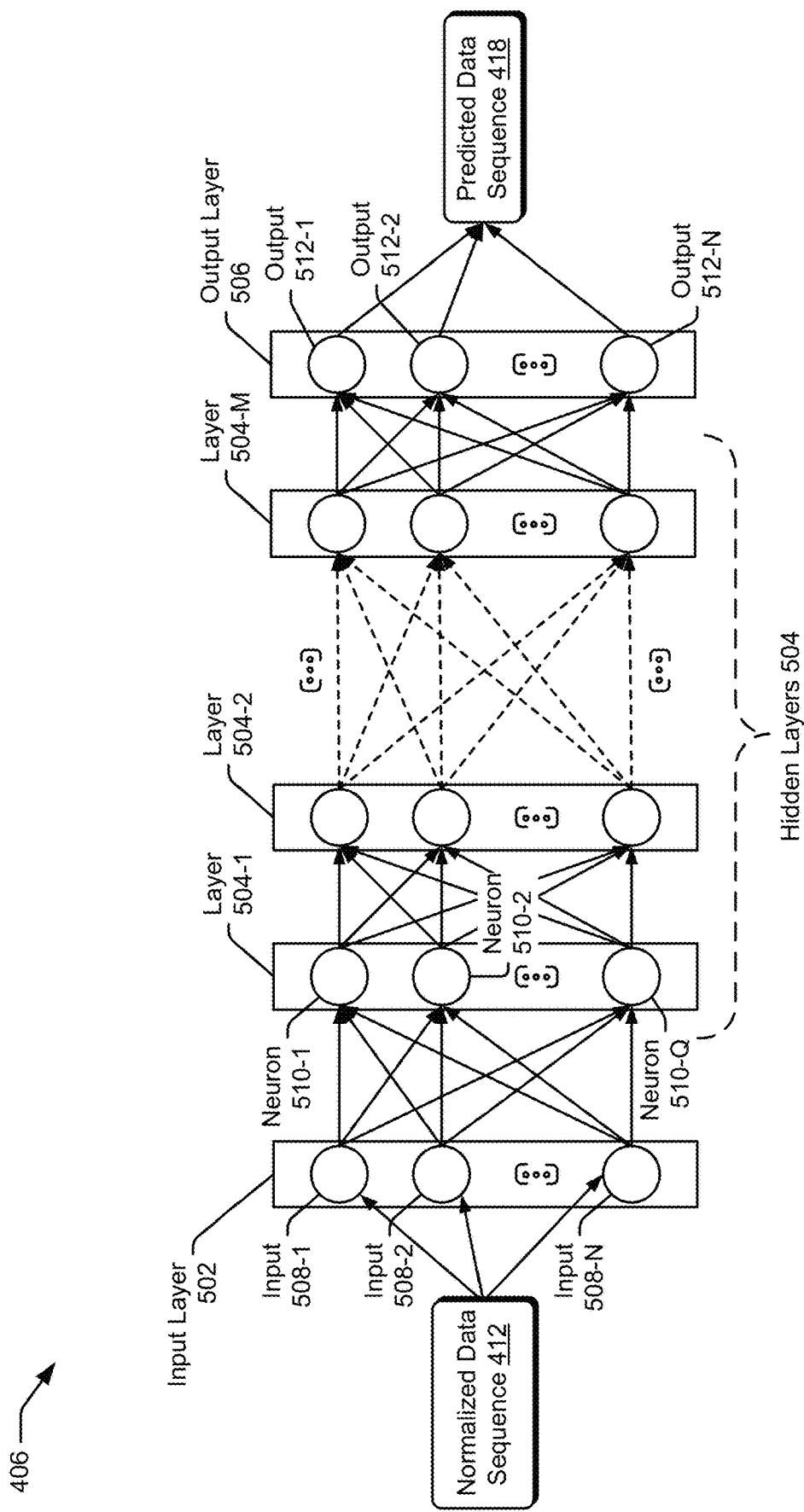
FIG. 5 illustrates an example implementation of a machine-learned module for detecting user gestures in the presence of saturation.

FIG. 5 illustrates an example implementation of the machine-learned module 406 for determining user gestures in the presence of saturation. In the depicted configuration, the machine-learned module 406 is implemented as a deep neural network and includes an input layer 502, multiple hidden layers 504, and an output layer 506. The input layer 502 includes multiple inputs 508-1, 508-2 . . . 508-N, where N represents a positive integer equal to a quantity of samples corresponding to the temporal processing window. The multiple hidden layers 504 include layers 504-1, 504-2 . . . 504-M, where M represents a positive integer. Each hidden layer 504 includes multiple neurons, such as neurons 510-1, 510-2 . . . 510-Q, where Q represents a positive integer. Each neuron 510 is connected to at least one other neuron 510 in a previous hidden layer 504 or a next hidden layer 504. A quantity of neurons 510 can be similar or different between different hidden layers 504. In some cases, a hidden layer 504 can be a replica of a previous layer (e.g., layer 504-2 can be a replica of layer 504-1). The output layer 506 includes outputs 512-1, 512-2 . . . 512-N.

Generally speaking, a variety of different deep neural networks can be implemented with various quantities of inputs 508, hidden layers 504, neurons 510, and outputs 512. A quantity of layers within the machine-learned module 406 can be based on the quantity of gestures and the complexity of the motion component signals 310 the saturation compensation module 220 is designed to recover. As an example, the machine-learned module 406 includes four layers (e.g., one input layer 502, one output layer 506, and two hidden layers 504) to recover the motion component signal 310 associated with a reaching gesture (e.g., such as in the example environment 100-2 of FIG. 1). Alternatively, the quantity of hidden layers can be on the order of a hundred to enable the saturation compensation module 220 to recover motion component signals associated with a fine or complex gesture, such as a knob-turning gesture, a spindle twisting gesture, or a three-dimensional gesture.

During gesture recognition, a set of input samples associated with the normalized data sequence 412 is provided to the input layer 502 based on the temporal processing window. Assuming the saturated radar receive signal 312 is generated based on a sampling rate of 20 Hz and a size of the temporal processing window represents a duration of 4 seconds, the set of input samples includes 80 samples, and a quantity of inputs 508 and outputs 512 (e.g., N) is equal to 80. Each neuron 510 in the hidden layers 504 analyzes a different section or portion of the set of input samples for different features. As an example, a first hidden layer 504-1 includes 10 neurons and a second hidden layer 504-2 includes eight neurons. Together, the hidden layers 504 compensate for disturbances that are present within the saturated radar receive signal 312 to recover the motion component signal 310. At the output layer 506, a set of predicted samples is generated, which is based on the motion component signal 310. The gesture recognition module 222 analyzes the set of predicted samples to recognize at least a portion of the gesture performed during this time period.

The above operations can continue for a subsequent set of input samples within the normalized data sequence 412. With training, the machine-learned module 406 can learn to recover a variety of different types of motion component signals 310 for a variety of different saturation levels to enable gesture detection to be performed while the radar system 104 is saturated.

Example Methods

Figure 6:
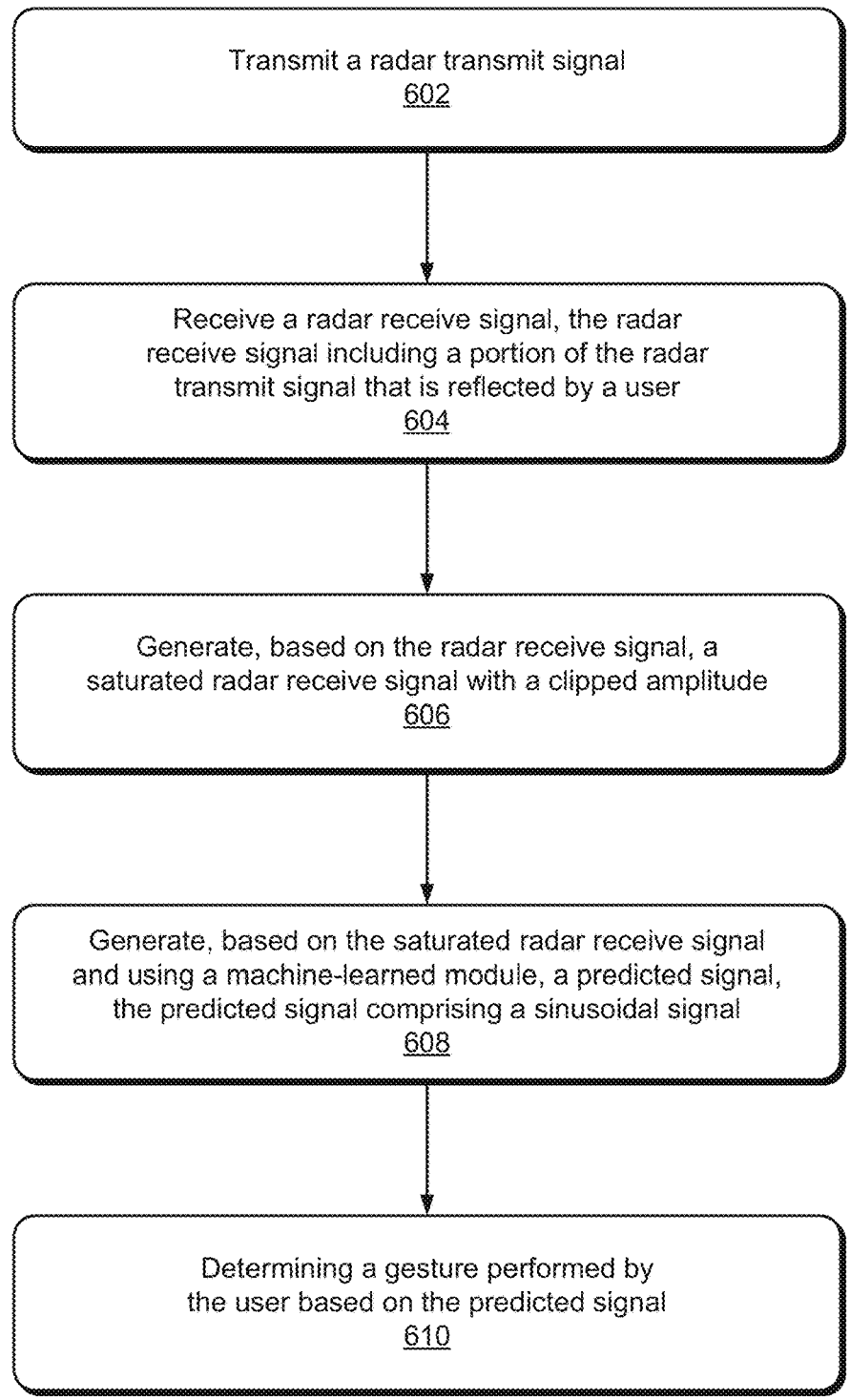
FIG. 6 illustrates an example method for performing operations of a smart-device-based radar system capable of detecting user gestures in the presence of saturation.

FIG. 6 depicts an example method 600 for performing operations of a smart-device-based radar system capable of detecting user gestures in the presence of saturation. Method 600 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-3 of FIG. 1, and entities detailed in FIG. 2 or 4, reference to which is made for example only. The techniques are not limited to performance by one entity or multiple entities operating on one device.

At 602, a radar transmit signal is transmitted. For example, the radar system 104 transmits the radar transmit signal 306 using the transmitter 302 and the antenna 212, as shown in FIG. 3. The radar transmit signal 306 can be a continuous-wave frequency-modulated signal (e.g., a chirp signal).

At 604, a radar receive signal is received. The radar receive signal includes a portion of the radar transmit signal that is reflected by a user. For example, the radar system 104 receives the radar receive signal 308 using the receiver 304 and the antenna 212, as shown in FIG. 3. The radar receive signal 308 includes a portion of the radar transmit signal 306 that is reflected by the user, such as a user shown in the example environments 100-1 to 100-3 of FIG. 1. The radar receive signal 308 also includes a motion component signal 310, which is associated with a gesture performed by the user. In some situations, a distance between the user and the radar system 104 or a radar cross section of the gesture results in an amplitude of the radar receive signal 308 saturating the receiver 304.

At 606, a saturated radar receive signal with a clipped amplitude is generated based on the radar receive signal. For example, the receiver 304 generates the saturated radar receive signal 312 with the clipped amplitude shown in the graph 112 of FIG. 1. The receiver 304 generates the saturated radar receive signal 312 based on the radar receive signal 308. The receiver 304 can generate the saturated radar receive signal 312 by amplifying, filtering, downconverting, demodulating, and/or digitizing the radar receive signal 308. The saturated radar receive signal 312 can include a distorted motion component signal 314 (of FIG. 3), which represents a distorted version of the motion component signal 310 due to signal clipping.

At 608, a predicted signal comprising a sinusoidal signal is generated based on the saturated radar receive signal and using a machine-learned module. For example, the saturation compensation module 220 uses machine learning to generate the predicted signal 316 based on the saturated radar receive signal 312. The predicted signal 316 comprises a sinusoidal signal, which represents the recovered motion component signal 310. In this way, the saturation compensation module 220 compensates for distortions caused by the saturation and increases performance of the radar system 104 by generating the predicted signal 316 to have a larger signal-to-noise ratio than the saturated radar receive signal 312.

At 610, a gesture performed by the user is determined based on the predicted signal. For example, the gesture recognition module 222 determines a gesture performed by the user based on the predicted signal 316.

Example Computing System

Figure 7:
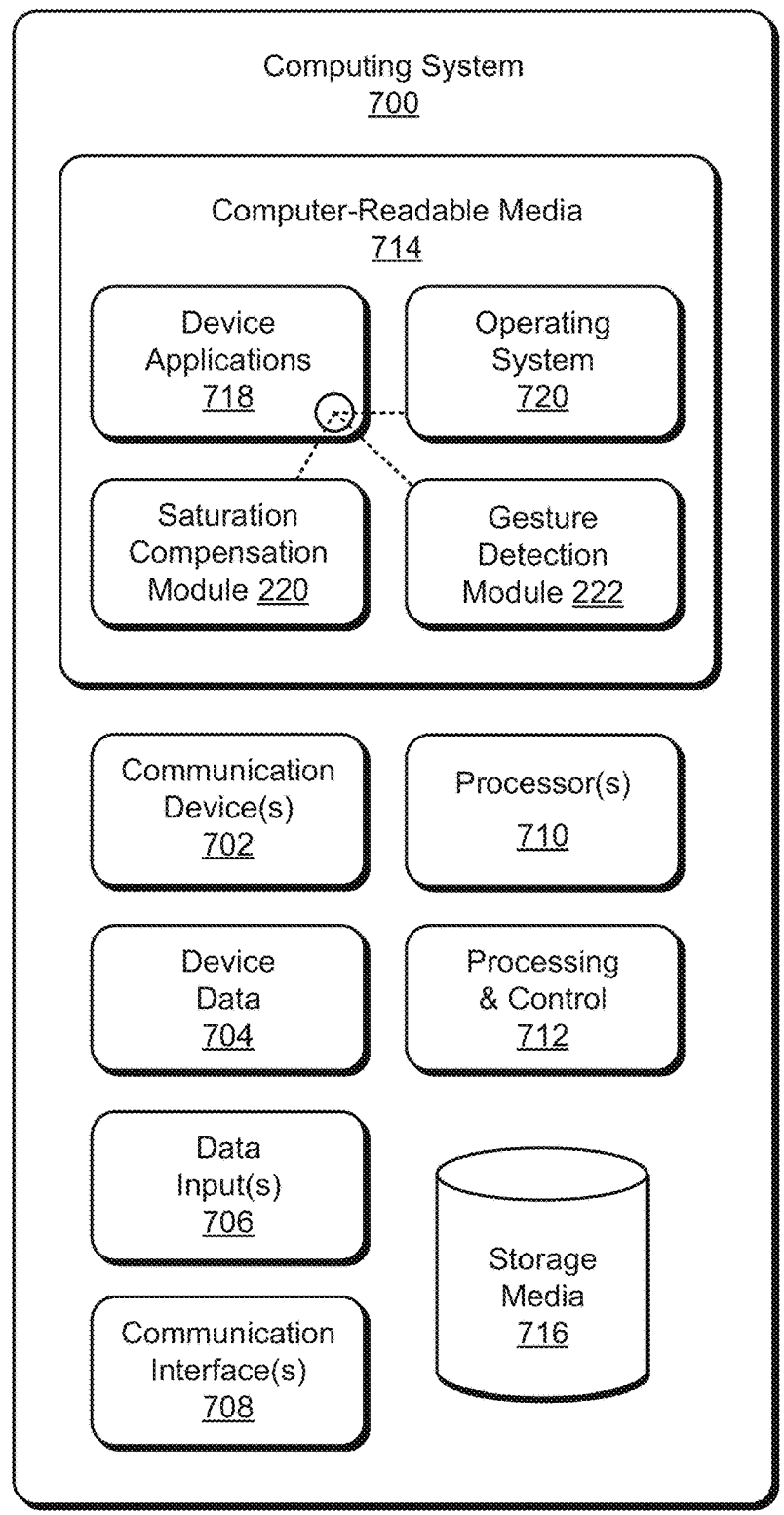
FIG. 7 illustrates an example computing system embodying, or in which techniques may be implemented that enable use of, a radar system capable of detecting user gestures in the presence of saturation.

FIG. 7 illustrates various components of an example computing system 700 that can be implemented as any type of client, server, and/or computing device as described with reference to the previous FIG. 2 to implement gesture recognition in the presence of saturation.

The computing system 700 includes communication devices 702 that enable wired and/or wireless communication of device data 704 (e.g., received data, data that is being received, data scheduled for broadcast, or data packets of the data). The device data 704 or other device content can include configuration settings of the device, media content stored on the device, and/or information associated with a user of the device. Media content stored on the computing system 700 can include any type of audio, video, and/or image data. The computing system 700 includes one or more data inputs 706 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 700 also includes communication interfaces 708, which can be implemented as any one or more of a serial and/or parallel interface, a wireless interface, any type of network interface, a modem, and as any other type of communication interface. The communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and the like), which process various computer-executable instructions to control the operation of the computing system 700 and to enable techniques for, or in which can be embodied, gesture recognition in the presence of saturation. Alternatively or in addition, the computing system 700 can be implemented with any one or combination of hardware, firmware, or fixed logic circuitry that is implemented in connection with processing and control circuits which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes a computer-readable media 714, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716.

The computer-readable media 714 provides data storage mechanisms to store the device data 704, as well as various device applications 718 and any other types of information and/or data related to operational aspects of the computing system 700. For example, an operating system 720 can be maintained as a computer application with the computer-readable media 714 and executed on the processors 710. The device applications 718 may include a device manager, such as any form of a control application, software application, signal-processing and control module, code that is native to a particular device, a hardware abstraction layer for a particular device, and so on.

The device applications 718 also include any system components, engines, or managers to implement gesture recognition in the presence of saturation. In this example, the device applications 718 include the saturation compensation module 220 and the gesture recognition module 222.

CONCLUSION

Although techniques using, and apparatuses including a smart-device-based radar system detecting user gestures in the presence of saturation have been described in language specific to features and/or methods, it is to be understood that the subject of the appended claims is not necessarily limited to the specific features or methods described. Rather, the specific features and methods are disclosed as example implementations of smart-device-based radar system detecting user gestures in the presence of saturation.

What is claimed is:

1. A smart device comprising:
a radar system including:
a transceiver configured to:
be coupled to at least one antenna;
transmit, via the at least one antenna, a radar transmit signal; and
receive, via the at least one antenna, a radar receive signal, the radar receive signal including a portion of the radar transmit signal that is reflected by a user, the radar receive signal causes the transceiver to become saturated such that the radar receive signal comprises a saturated receive signal, the saturated receive signal comprising an analog signal having a clipped amplitude that is constrained by an upper bound or a lower bound, the upper bound or the lower bound causing the amplitude of the analog signal to be relatively constant at the upper bound or the lower bound for a portion of the analog signal; and
a saturation compensation module coupled to the transceiver and configured to generate, based on the saturated radar receive signal and using a machine-learned module, a predicted signal, the predicted signal comprising a sinusoidal signal.

2. The smart device of claim 1, wherein:
the radar receive signal includes a motion component signal associated with at least a portion a gesture performed by the user;
the saturated radar receive signal includes a distorted version of the motion component signal based on the clipped amplitude; and
the saturation compensation module is configured to recover the motion component signal from the saturated radar receive signal such that the predicted signal is based on the motion component signal.

3. The smart device of claim 1, wherein an amplitude of the radar receive signal exceeds a saturation threshold of the transceiver.

4. The smart device of claim 1, wherein the saturation compensation module includes a normalization module coupled to the transceiver, the normalization module configured to normalize the saturated radar receive signal to produce a normalized data sequence, the normalized data sequence used to generate the predicted signal.

5. The smart device of claim 4, wherein the machine-learned module is configured to:
accept a set of normalized samples within the normalized data sequence based on a temporal processing window, the normalized data sequence including a motion component signal associated with a gesture performed by the user, the motion component signal distorted within the normalized data sequence based on the clipped amplitude of the saturated radar receive signal; and recover the motion component signal from the saturated radar receive signal to produce a set of predicted samples associated with the predicted signal, the set of predicted samples based on the motion component signal, the set of normalized samples and the set of predicted samples having similar quantities of samples based on a size of the temporal processing window.

6. The smart device of claim 5, wherein:
the saturation compensation module includes a training module coupled to the machine-learned module and the normalization module, the training module configured to:
provide a training data sequence to the normalization module; and
provide truth data to the machine-learned module;
the normalization module is configured to generate another normalized data sequence based on the training data sequence; and
the machine-learned module is configured to execute a training procedure to determine machine-learning parameters based on the other normalized data sequence and the truth data.

7. The smart device of claim 6, wherein the training module is configured to:
generate sinusoidal signals to simulate non-saturated radar receive signals, the sinusoidal signals representing the truth data; and
generate non-sinusoidal signals having different clipped amplitudes to simulate probable saturated radar receive signals, the non-sinusoidal signals representing saturated versions of the non-saturated radar receive signals, the non-sinusoidal signals representing the training data sequence.

8. The smart device of claim 7, wherein:
the sinusoidal signals have different frequencies; and
frequencies of the non-sinusoidal signals correspond to the different frequencies of the sinusoidal signals.

9. The smart device of claim 7, wherein the sinusoidal signals and the non-sinusoidal signals are periodic.

10. The smart device of claim 6, further comprising:
a proximity sensor configured to measure different distances between the smart device and the user,
wherein the training module is coupled to the proximity sensor and configured to:
generate the truth data based on the measured distances;
cause the radar system to transmit at least one other radar transmit signal and receive at least one other radar receive signal while the proximity sensor measures the distances; and
generate the training data sequence based on the at least one other radar receive signal.

11. The smart device of claim 1, further comprising:
a gesture recognition module coupled to the saturation compensation module and configured to determine a gesture performed by the user based on the predicted signal.

12. A method comprising:
transmitting, using a transceiver, a radar transmit signal;
receiving, using the transceiver, a radar receive signal, the radar receive signal including a portion of the radar transmit signal that is reflected by a user, the radar receive signal causing the transceiver to become saturated such that the radar receive signal comprises a saturated receive signal, the saturated receive signal comprising an analog signal having a clipped amplitude that is constrained by an upper bound or a lower bound, the upper bound or the lower bound causing the amplitude of the analog signal to be relatively constant at the upper bound or the lower bound for a portion of the analog signal; and
generating, based on the saturated radar receive signal and using a machine-learned module, a predicted signal, the predicted signal comprising a sinusoidal signal.

13. The method of claim 12, wherein:
the radar receive signal includes a motion component signal associated with a gesture performed by the user;
the motion component signal within the saturated radar receive signal is distorted based on the clipped amplitude; and
the generating of the predicted signal comprises recovering the motion component signal from the saturated radar receive signal.

14. The method of claim 13, wherein the causing of the motion component signal to become distorted is based on an amplitude of the radar receive signal exceeding a saturation threshold of the transceiver.

15. The method of claim 14, further comprising:
increasing an amplitude of the radar transmit signal to increase a sensitivity of the transceiver, the increasing of the amplitude increasing a likelihood of an amplitude of another radar receive signal to exceed the saturation threshold of the transceiver.

16. The method of claim 12, further comprising:
training the machine-learned module, the training of the machine-learned module comprising:
generating sinusoidal signals to simulate non-saturated radar receive signals;
providing the sinusoidal signals as truth data to the machine-learned module;
generating non-sinusoidal signals having different clipped amplitudes to simulate probable saturated radar receive signals having similar frequencies as the sinusoidal signals; and
providing the non-sinusoidal signals as a training data sequence to the machine-learned module.

17. The method of claim 12, further comprising:
training the machine-learned module, the training of the machine-learned module comprising:
accepting, from a proximity sensor, measurement data associated with different distances between a radar system and the user during a given time period;
transmitting, using the radar system, at least one other radar transmit signal during the given time period;
receiving, using the radar system, at least one other radar transmit signal associated with the at least one other radar transmit signal during the given time period;
generating the truth data based on the measurement data;
generating a training data sequence based on the at least one radar receive signal; and
providing the training data sequence and the truth data to the machine-learned module.

18. A non-transitory computer-readable storage media comprising computer-executable instructions that, responsive to execution by a processor, implement:
a saturation compensation module configured to:
accept an input data sequence associated with a saturated radar receive signal, the saturated radar receive signal having a clipped amplitude that distorts a motion component signal associated with a gesture performed by a user, the saturated radar receive signal including a distorted version of the motion component signal; and recover, using a machine-learned module, the motion component signal from the input data sequence to produce a predicted data sequence based on the motion component signal, the predicted data sequence comprising a sinusoidal signal.

19. The non-transitory computer-readable storage media of claim 18, wherein:

the saturation compensation module includes a normalization module configured to normalize the input data sequence to produce a normalized data sequence; and the machine-learned module is configured to:

accept a set of normalized samples within the normalized data sequence based on a temporal processing window; and recover the motion component signal from the set of normalized samples to produce a set of predicted samples associated with the predicted data sequence, the set of normalized samples and the set of predicted samples having similar quantities of samples based on a size of the temporal processing window.

20. The non-transitory computer-readable storage media of claim 19, wherein:

the saturation compensation module includes a training module configured to:

generate sinusoidal signals to simulate non-saturated radar receive signals, the sinusoidal signals representing truth data;

generate non-sinusoidal signals having different clipped amplitudes to simulate probable saturated radar receive signals having similar frequencies as the sinusoidal signals, the non-sinusoidal signals representing a training data sequence; and provide the sinusoidal signals and the non-sinusoidal signals to the machine-learned module; and the machine-learned module is configured to execute a training procedure based on the sinusoidal signals and the non-sinusoidal signals.

\* \* \* \* \*